(12) United States Patent
Ohmi et al.

(10) Patent No.: US 6,940,034 B2
(45) Date of Patent: Sep. 6, 2005

(54) LONG LIFE WELDING ELECTRODE AND ITS FIXING STRUCTURE, WELDING HEAD, AND WELDING METHOD

(75) Inventors: Tadahiro Ohmi, 1-17-301, Komegabukuro 2-chome, Aobe-ku, Sendai-shi, Miyagi-ken 980-0813 (JP); Takahisa Nitta, Tokyo (JP); Yasuyuki Shirai, Miyagi-ken (JP); Osamu Nakamura, Miyagi-Ken (JP)

(73) Assignees: Tadahiro Ohmi, Miyagi-ken (JP); Kabushiki Kaisha Ultraclean Technology Research Institute, Tokyo (JP)

(*) Notice: Subject to any disclaimer, the term of this patent is extended or adjusted under 35 U.S.C. 154(b) by 0 days.

(21) Appl. No.: 10/640,105

(22) Filed: Aug. 12, 2003

(65) Prior Publication Data

US 2005/0098543 A1 May 12, 2005

Related U.S. Application Data

(62) Division of application No. 10/266,480, filed on Oct. 8, 2002, which is a division of application No. 09/045,526, filed on Mar. 20, 1998, now Pat. No. 6,462,298.

(30) Foreign Application Priority Data

Mar. 20, 1997 (JP) ................................. 9-87431
Mar. 20, 1998 (JP) ............................... 10-72597

(51) Int. Cl.[7] .............................................. B23K 9/167
(52) U.S. Cl. ........................................ 219/75; 228/219
(58) Field of Search ....................... 219/74, 75; 228/219

(56) References Cited

U.S. PATENT DOCUMENTS

| | | | | |
|---|---|---|---|---|
| 2,591,926 A | * | 4/1952 | Gibson et al. | ................ 219/74 |
| 2,905,805 A | * | 9/1959 | McElrath et al. | ............. 219/74 |
| 5,083,002 A | * | 1/1992 | Hoback et al. | ............... 219/74 |
| 5,597,109 A | * | 1/1997 | Ohmi et al. | ................. 228/219 |

FOREIGN PATENT DOCUMENTS

| | | | | |
|---|---|---|---|---|
| JP | 58-29581 A | * | 2/1983 | |
| JP | 6/106348 A | | 4/1984 | ............ B23K/9/08 |
| JP | 6/39543 A | | 2/1994 | .......... B23K/9/035 |
| JP | 6/87093 A | | 3/1994 | .......... B23K/37/00 |
| JP | 6/109200 A | | 4/1994 | ............. F17D/1/04 |
| JP | 6/142932 A | | 5/1994 | ............ B23K/9/16 |
| JP | 6/182558 A | | 7/1994 | ............ B23K/9/32 |
| JP | 6/210483 A | | 8/1994 | .......... B23K/31/00 |
| JP | 06328256 A | | 11/1994 | ............ B23K/9/29 |
| JP | 06335777 A | | 12/1994 | ............ B23K/9/29 |
| JP | 07060446 A | | 3/1995 | ............ B23K/9/16 |
| JP | 07060476 A | | 3/1995 | .......... B23K/33/00 |
| JP | 07197207 A | | 8/1995 | .......... C22C/38/00 |
| JP | 07323374 A | | 12/1995 | ............ B23K/9/23 |
| JP | 08168896 A | | 7/1996 | ......... B23K/37/053 |
| JP | 09078221 A | | 3/1997 | ............. C23C/8/12 |

* cited by examiner

Primary Examiner—Clifford C. Shaw
(74) Attorney, Agent, or Firm—Randall J. Knuth

(57) ABSTRACT

A fixing structure for a welding electrode and a welding head is shown which enable improvement of durability of a welding electrode, improvement of work efficiency in welding, and a reduction of time required for welding and also which make it possible to execute welding for an extended time with high reliability. In the fixing structure, a fixed section of a welding electrode is inserted via a thermally conductive material into an inserting section of a fixing base and a peripheral surface of the fixed section of the welding electrode is uniformly contacted to the fixing base to affix the welding electrode to the fixing base.

4 Claims, 11 Drawing Sheets

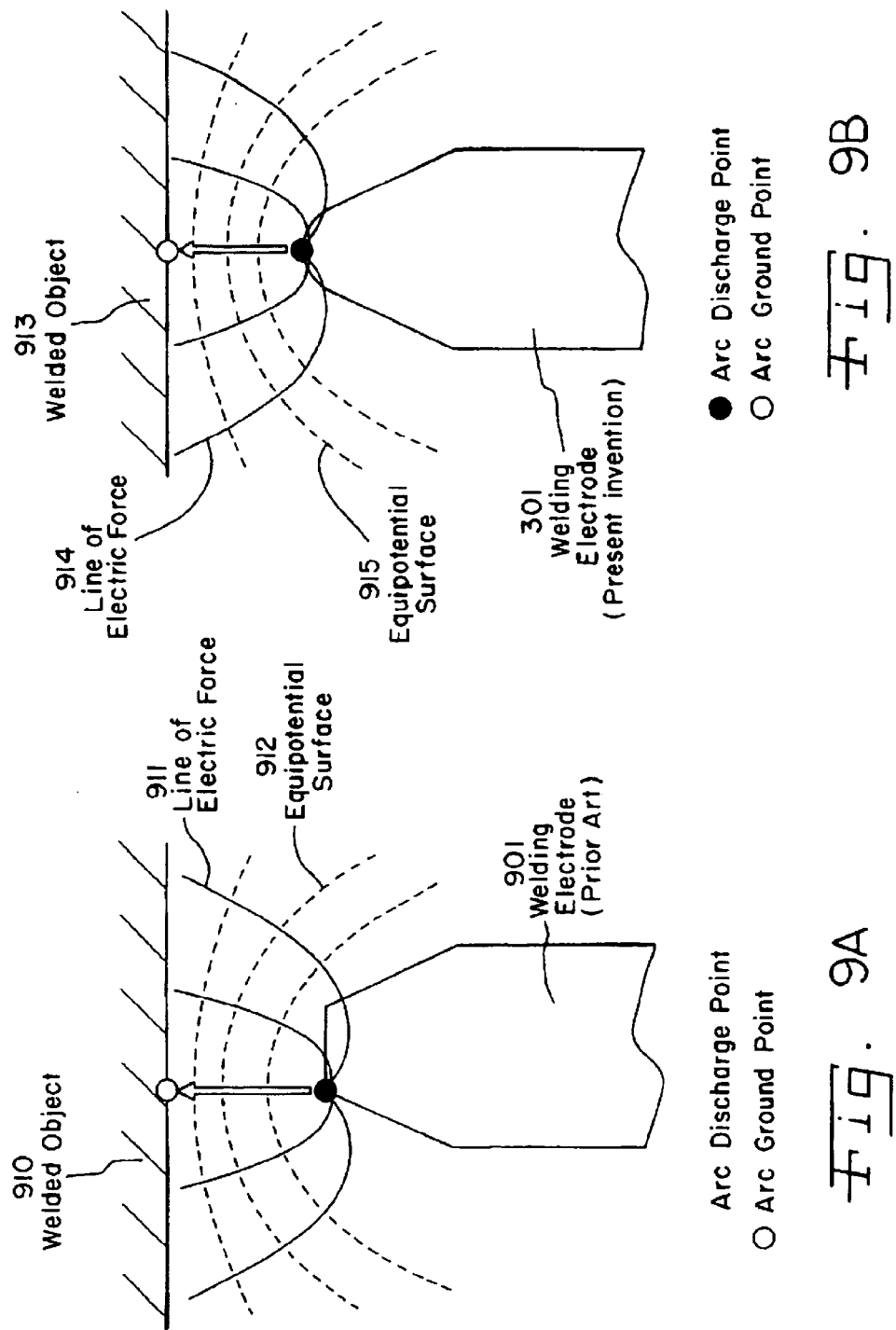
Fig. 9A — Fig. 9B

Schematic View of an Apparatus Used for Measuring a Temperature of Electrode

US 6,940,034 B2

LONG LIFE WELDING ELECTRODE AND ITS FIXING STRUCTURE, WELDING HEAD, AND WELDING METHOD

CONTINUATION DATA

This is a divisional of U.S. patent application Ser. No. 10/266,480, filed on Oct. 8, 2002, which is a divisional of patent application Ser. No. 09/045,526 filed on Mar. 20, 1998 now U.S. Pat. No. 6,462,298, the disclosure of each of which is herein explicitly incorporated by reference.

BACKGROUND OF THE INVENTION

1. Field of the Invention

The present invention relates to a long-life welding electrode and a fixing structure for the same, a welding head, and to a welding method.

2. Description of the Related Art

Conventional types of electrodes for welding are divided to those each having a sharp tip and those each having a flat tip. And in electrodes for welding having a sharp tip, the form remarkably changes during use and the durability is low, while, in those having a flat chip, the form little changes, but the arc discharge characteristic is remarkably degraded, and for the reasons as described above, in both types of electrode for welding, the frequency of exchange and replacement is high and the work efficiency is low.

In a conventional type of electrode 901 having a flat tip at shown in FIG. 9(b), there are a number of points at which a distance between the welding electrode 901 and a welded object 910 becomes shortest (arc grounding point:), and a point, from which an arc discharge is generated (arc discharge point:), at various points, so that an arc used for welding can not be kept stable.

Also, a welding electrode is worn out along a form of an equipotential surface, and it has been found out that a welding electrode having a sharp tip (with an angle from 30 to 60 degrees), is easily worn out and it is impossible to execute welding for a long time under stable conditions.

On the other hand, it has been tried to develop a technology of adding around 2 weight % of $ThO_2$ (thoria) in a base material for a welding electrode (W) for the purpose to improve durability of the electrode.

When thoria is added, sometimes the durability may be improved, but the durability is not always improved. That is to say, the effect provided by adding thoria is not constant.

Conventionally, a welding electrode is fixed with a screw. That is to say, as shown in FIG. 2, a welding electrode 201 is fixed to a fixing base 202 by inserting the welding electrode 201 into an inserting section 204 of a fixing base 202 having the inserting section 204 and also passing a set screw 203 through a screw hole provided in a side of the fixing base 202.

With the conventional type of fixing structure as described above, however, the welding electrode is degraded.

Generally argon in used as a welding gas, but argon is poor in its thermal conductivity, and high a current value is required for welding, so that a temperature of the welding electrode increases and durability of the electrode is worsened.

Further, a welding gas is supplied via a welding power supply unit with a resin-based material emitting a large quantity of gas used in piping in the power supply unit. Also a resin-based material is used for a tube for connection among a gas supply system, a welding power supply unit, and a welding head, so that local atmosphere is worsened by the resin material during welding and the welding electrode may be oxidized and degraded (Refer to FIG. 6).

Engineers are required for replacement of a degraded electrode, and many engineers are required for the conventional type of electrodes each frequently requiring replacement, further, a long time is required for this work for replacement, so that the work efficiency is low, which does now allow welding with high reliability.

SUMMARY OF THE INVENTION

It is an object of the present invention to provide an electrode for welding and a fixing structure for the same, a welding head, and a welding method which make it possible to improve durability of a welding electrode, because of the forms and materials thereof as well as of the atmosphere for welding, to largely reduce the frequency of exchange of welding electrodes and also reduce the number of engineers and the time required for exchanging welding electrodes, to improve the work efficiency, and to enable wending with high reliability for a long time.

(1) A welding electrode according to the present invention is characterized in that a tip section thereof has a curved surface. More specifically, this curved surface should preferably be like a form of a equipotential surface which is vertical against an electric line of force generated between a welding electrode and a material to be welded.

With the configuration as described above, as shown in FIG. 9(a), an arc discharge position is kept constant, and wearing of the electrode can be suppressed by uniformly generating a current generated from a welding electrode, which makes it possible to improve durability of the welding electrode.

It is preferable from the view point of further improving durability of a welding electrode that the curved surface is an arch-formed one with a diameter from 0.05 mm or more to 0.3 mm or less.

(2) The welding electrode according to the present invention is characterized in that at least one type of oxide selected from a group comprising lanthana, yttrium, and ceria is added to a mother or base material for the electrode.

The present inventors made strenuous efforts to understand how a life of a welding electrode is decided. As a result, it was found out that a life of wiring (ι) used in the semiconductor industry is applicable to a life of a welding electrode, and the equating for a life of wiring (ι) is as follows:

$$\iota = (E_0/(\rho J^2))\exp(Ea/kT)$$

wherein J indicates a current density, ρ indicates a resistivity of wiring, $E_0$ indicates a constant specified to the wiring, k indicates a Boltzmann constant, T indicates a temperature of wiring, and Ea indicates the energy for activation.

Herein, assuming that a material for the welding electrode is constant, a resistivity ρ of the welding electrode, $E_0$, Ea, and k are kept unchanged, and also assuming that the temperature T on the welding electrode when a type of welding gas and a welding current are changed with a distance between the welding electrode and an object to be welded and a melting area of the object to be welded kept unchanged is constant, a life (ι) of the welding electrode is expressed by the following equation:

$$\iota = (1/J^2)A$$

wherein $A=(E_0/\rho)\exp(Ea/kt)$, and from this expression it can be understood that the life of a welding electrode is inverse proportion to a square of the current density. Herein, if a form of the welding electrode's tip is as shown in FIG. 1 and is kept unchanged, it is possible to substitute the current density for a current value, and also as shown FIG. 3 describing below, if a distance between the welding electrode and an object to be welded is fixed and a melting area of an object to be welded and a form of the welding electrode are kept unchanged, a life of the welding is decided only be a current value.

Also, a current value during welding is lowered because, when a gas with a high thermal conductivity (such as hydrogen or helium) is added, an arc polar is made thinner because of the thermal pinch effect and a density of electrons irradiated to the object to be welded becomes higher.

As described above, a life of a welding electrode is decided by a current density, and as a current density is smaller, a life of a welding electrode becomes longer.

A current density is expressed by the expression of $J=AT^2\exp(-\Phi/kT)$. Herein J indicates a current density, A indicates a thermoelectron discharge constant, T indicates a temperature of an electrode, K indicates a Boltzmann constant, and $\Phi$ indicates a work function. For this reason, to improve the thermoelectron performance during arc discharge, a work with a small work function should be used. For that purpose, an oxide with a small work function may be added to a mother material for a welding electrode. However, if a melting point or base of the added oxide is low, the oxide is evaporated during welding, and when the welding electrode is used frequently, the electrode is degraded. So by using an oxide with a small work function and also with a high melting point and a high boiling point to improve the thermoelectron discharge performance as well as to prevent evaporation of a welding electrode due to frequency use thereof, durability of the welding electrode can be improved.

Herein a melting point, a boiling point, and a work function of each material are shown in Table 1.

TABLE 1

| Material | Melting point (° C.) | Boiling point (° C.) | Work function (eV) |
| --- | --- | --- | --- |
| W | 3400 | 5700 | 4.6 |
| ThO$_2$ | 3220 | 4400 | 1.66–6.32 |
| LaO$_3$ | 2307 | 4200 | 2.8–4.2 |
| Y$_2$O$_3$ | 2410 | 4300 | 2.0 |
| CeO$_2$ | 1950 | | |
| ZrO | 2680 | 4275 | |
| WO$_3$ | 1473 | 1837 | |

As described above, conventionally it has been tried to improve the durability of a welding electrode by adding thoria. However, the correlation between addition of thoria and improvement of durability as described above has not been clarified. Also as shown in Table 1, a value of thoria's work function extends in a board range. This can be regarded as one of the reasons why the effect obtained by adding thoria is not stable.

In the present invention, an oxide with a low work function and a high melting point is added to a mother or base material for a welding electrode. Generally an oxide with a work function smaller than that of tungsten and a melting point higher than 2000° C. is used. More specifically, any of lanthana, yttria, and zirconia is added.

Addition of an oxide should preferably be in a range from 1 wt % to 5 wt %, and more preferably be in a range from 2 wt % to 5 wt %. When the addition is 1 wt % or more, durability of an electrode is improved more remarkably. When the addition is more than 5 wt %, as the melting point is lower than that of tungsten as the base material, sometimes the electrode itself may be reduced. For this reason, the addition should preferably be in a range from 2 wt % to 5 wt %.

When an oxide is added, a life of a welding electrode has correlation with a current value during welding, and the durability can be improved by reducing a current value, so that durability of a welding electrode can be improved by adding a gas with a high thermal conductivity as a welding gas to lower a current value loaded to the electrode during welding by making use of a the thermal pinch effect and also to lower a temperature of the welding electrode.

Rmax at a surface of a welding electrode should preferably be in a range from 3 $\mu$m or more to 10 $\mu$m or less. When a surface of a welding electrode is made smooth, it becomes possible to suppress emission of a gas from the welding electrode as well as to prevent degradation of the electrode with the durability of the electrode improved. For that purpose, Rmax at a surface of the electrode should preferably be 10 $\mu$m or less. also if the Rmax is more than 10, an arc is generated and the arc can not disadvantageously be kept stable, but the arc during welding can be kept stable when the value is 10$\mu$ or less. It should be noted that, even when Rmax is 3$\mu$ or less, the effect is saturated and the cost becomes disadvantageously high.

(3) The structure for fixing a welding electrode according to the present invention is characterized in that a fixed section of the welding electrode is inserted via a thermally conductive material into an inserting section of a fixing base for a welding electrode to be inserted therein, and a peripheral surface of the fixed section of the welding electrode is uniformly contacted to the fixing base to fix the welding electrode to the fixing base.

As shown in FIG. 2, conventionally a welding electrode 201 is fixed to a fixing base with a screw, but in this fixing system, the welding electrode 201 is degraded as described above.

The present inventors made strenuous efforts for finding out the cause, and found out the cause that a clearance with a width of around 100 $\mu$m exists between the welding electrode 201 and the fixing bench 202 and the clearance degrades the welding electrode. Namely, this clearance hinders emission of heat from the welding electrode 201, which causes degradation of the welding electrode 201.

In the present invention, as shown in FIG. 3, a contact area between a welding electrode 301 and a fixing base 302 is made larger by providing a thermally conductive material 304 between the welding electrode 301 and the fixing base 302, which makes easier transmission of heat generated by welding with the temperature increase in the welding electrode 301 suppressed, deformation of the electrode prevented, and also degradation of the electrode prevented. With this feature, the durability of a welding electrode can be improved.

As a thermally conductive material, for instance, such a material as Cu, Au, Ag, or Pt is used.

To provide the thermally conductive material between a welding electrode and a fixing base, for instance, a powder-state, thermally conductive material dissolved in a organic solvent may be poured into a section between the welding electrode and the fixing base and then dried.

(4) In the structure for fixing a welding electrode according to the present invention, for instance, the fixing base is divided to several pieces, and a fixed section of a welding electrode is fixed by holding the fixed section with the divided pieces of the fixing base.

In the present invention, a fixing base is divided to several portions, and a welding electrode is fixed by being held between the divided portions of the fixing base. Because of this feature, the welding electrode and fixing base are contacted to each other without any clearance therebetween, and the performance for emitting heat from a welding electrode is improved. In other words, emission of heat generated during welding is made easier with a temperature increase in the welding electrode suppressed and also deformation of the electrode prevented, thus degradation of the electrode is prevented. Because of this feature, durability of a welding electrode can be improved.

It should be noted that, also in this case it is preferable to provide a thermally conductive material between the welding electrode and the fixing base. For the purpose of providing a thermally conductive material between the welding electrode and the fixing base, for instance, a powder-state, thermally conductive material dissolved in an organic solvent may be applied to a section between the welding electrode and the fixing base and then dried.

(5) A welding method according to the present invention is characterized in that welding is executed by using any of (1) a mixed gas of argon and helium, (2) a mixed gas of helium and hydrogen, and (3) a mixed gas of argon, helium, and hydrogen as a welding gas.

Herein, a content of helium in each mixed gas should preferably be in a range from 1 to 90 percent.

In the present invention, a welding current is reduced with durability of a welding electrode improved by adding hydrogen or helium each having a high thermal conductivity or a mixture of hydrogen and helium. Also as hydrogen is a reducing gas, oxidization of a welding electrode is prevented, thus degradation of the welding electrode is prevented.

A content of helium should preferably be in a range from 1 to 90 percent, more preferably in a range from 1 to 20 percent, and further preferably in a range from 0.5 to 10 percent.

Tungsten in a welding electrode is easily oxidized, and the oxidized tungsten degrades the arc discharge performance.

The durability of a welding electrode can be improved by using an all-metallic (stainless) gas supply system in place of a resin-based one, discharging gas for a supply tube for a welding gas so that no impurities (such as moisture) will be included in the welding gas for the purpose of preventing the electrode from being degraded. Especially, as stainless steel with an impassive layer made of a chrome oxide formed on a top surface thereof emits little gas, it is preferable to use the stainless steel.

As described above, with the present invention, the durability of a welding electrode is improved with the work efficiency in welding improved, while also the time for replacement required in the conventional technology and the number of required operators can be reduced and welding can be executed for a long time, with high reliability.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 9 is a conceptual view showing an arc discharge point and an arc grounding point, and FIG. 9($a$) shows an example of the conventional technology, while FIG. 9($b$) shows an example of the present invention;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

| Description of Signs | |
|---|---|
| 201, 301: Electrode | 607, 701: Welding power |
| 202, 302: Fixing base | 604: Welding bomb |
| 203: Set screw | 702: Welding gas supply system |
| 303: Silver used for fixing an electrode to a fixing base | 703: Stainless tube |
| | 705: Welding bomb |
| | 706: Electric cable |

Next, detailed description is made for a welding electrode, a welding head, and a welding gas supply system each according to the present invention with reference to the related drawings, but it should be noted that the present invention is not limited to the embodiments describe below.

In the embodiments described below, a welding power supply unit (SPB-100-T4) and a welding machine (K8452T) each according to and obtainable from Astro Arc Co. were used.

Embodiment 1

Figure 1:
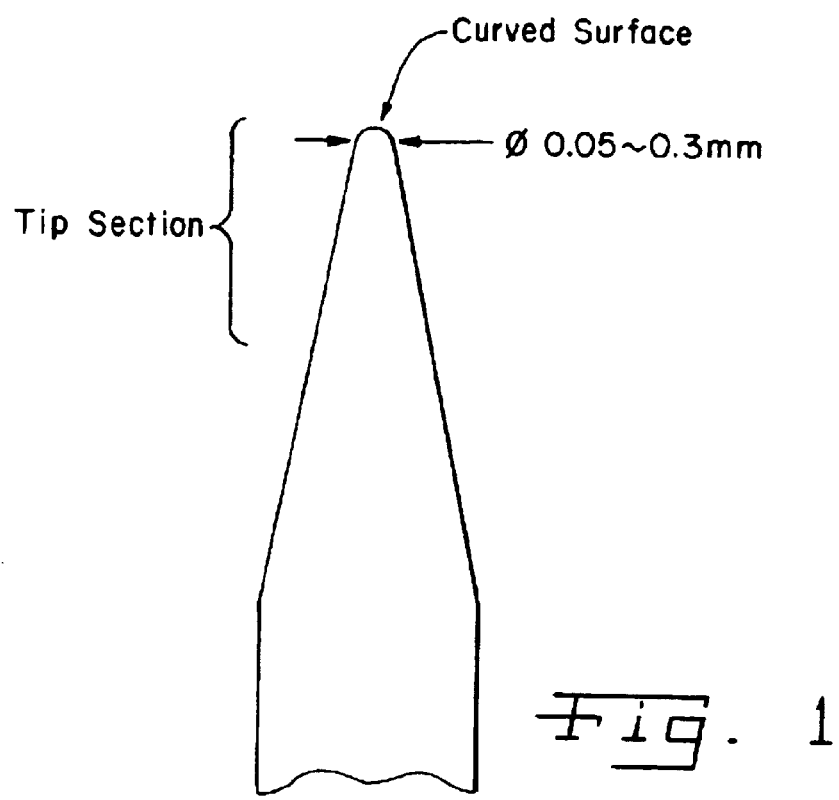
FIG. 1 is a simulated view showing an example of a form of a welding electrode according to the present invention.

In this embodiment, a tip section of a welding electrode with a diameter of 1.6 mm was formed into a shape similar to an equipotential surface as shown in FIG. 1, and more specifically, to a semispherical tip with a diameter of 0.12 mm.

Times of welding up to a time when a shape of each welding electrode changed with also a distance from the welding electrode and an object to be welded changed and welding became impossible are shown in Table 2.

It should be noted that a tungsten electrode with 2 wt % $ThO_2$ added thereto was used and each welding electrode was tested under the same welding conditions.

TABLE 2

| Form | Shape of an equipotential surface | Sharp form | Flat form |
|---|---|---|---|
| Times | 550 | 60 | 50 |

It is clearly understood from Table 2 that durability of an electrode having a tip section with a form similar to an equipotential surface is far better as compared to that of an electrode with a sharp tip section or an electrode with a flat tip section.

It should be noted that burning of a surface of a welded object did not occur.

Further, the mechanism characteristics such as the tensile strength and the bending strength of a welding section were not inferior to those of welding electrodes based on the conventional technology.

Embodiment 2

In this embodiment, $La_2O_3$, an oxide with a high melting point and a low work function, was added to a welding electrode by 2 wt % to improve the thermoelectron discharge performance as well as the durability of the electrode. The assessing method was the same as that in Embodiment 1, and the result is as shown in Table 3.

In this embodiment, an electrode with a tip form similar to that of a equipotential surface, and more specifically an electrode with a semispherical tip having a diameter of 0.12 mm was used, and each electrode was tested under the same welding conditions.

TABLE 3

| 100% tungsten | 100% tungsten | $ThO_2$ added by 2 wt % | $La_2O_3$ by 2 wt % |
|---|---|---|---|
| Times | 0 | 550 | 650 |

It is clearly understood from Table 3 that the welding electrode with $La_2O_3$ having a high melting point and a low work function value added thereto degraded less with the durability improved more as compared to the welding electrode with $ThO_2$ added thereto.

In this embodiment, $La_2O_3$ was used, but the durability can be improved also when $Y_2O_3$ with a high melting point and a low work function value is used.

It should be noted that burning of a surface of a welded object did not occur.

Also the mechanical characteristics such as the tensile strength of the bending strength were not inferior to those of welding electrodes based on the conventional technology.

Embodiment 2-2

To check what effects an oxide included in a material for an electrode gives to the performance of the welding electrode, various types of oxide were added and the voltage-current characteristics during welding was checked by using the LR4110 Recorder Model 1371136 from YOKOGAWA Co.

It should be noted that the welding power supply unit (SPB-100-T4) and the welding machine (K8752T) each supplied from Astro Arc Co. were used for welding.

It is desirable to add an oxide with a low work function for improving the electron discharge characteristic in arc discharge to a welding electrode, as well as with a high melting point, for preventing change of physical properties due to a temperature in welding. In this embodiment, electrodes with such materials as thoria, lantana, ceria, yttria, and zirconia added thereto respectively were used.

Figure 10:
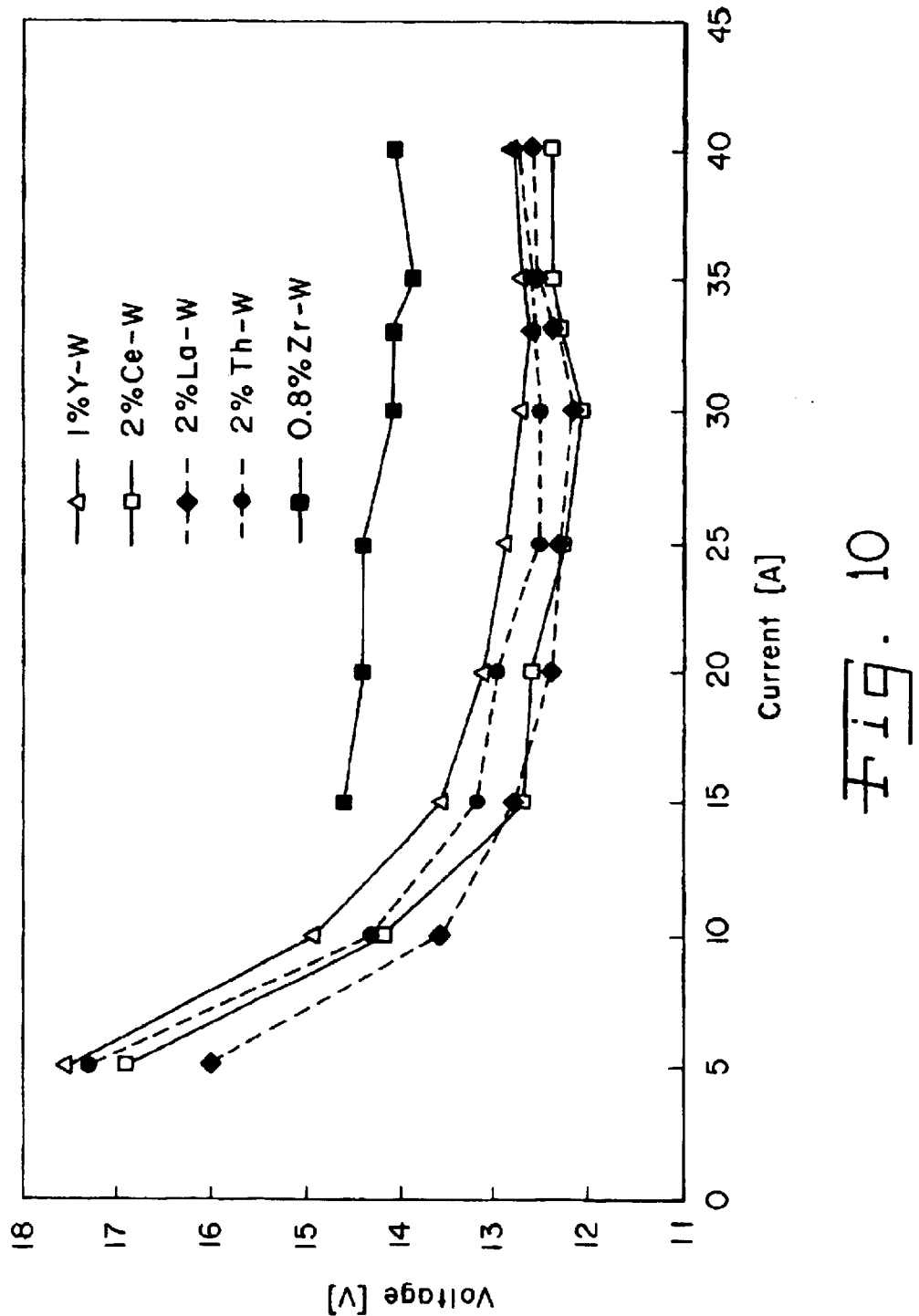
FIG. 10 is a graph showing the voltage-current characteristics in Embodiment 2-2.
Figure 11:
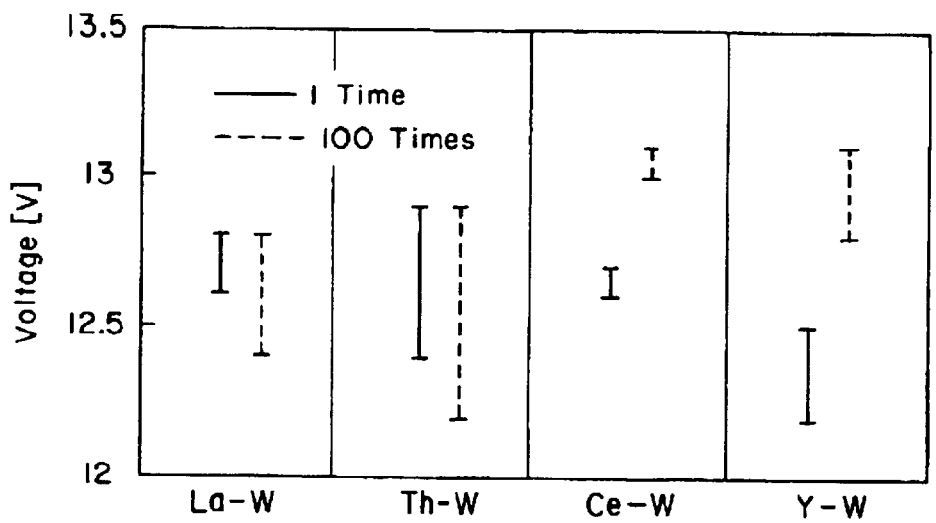
FIG. 11 is a graph showing a result of voltage measurement when welding at the first time is compared to that at one hundredth time in Embodiment 2-2.
Figure 12:
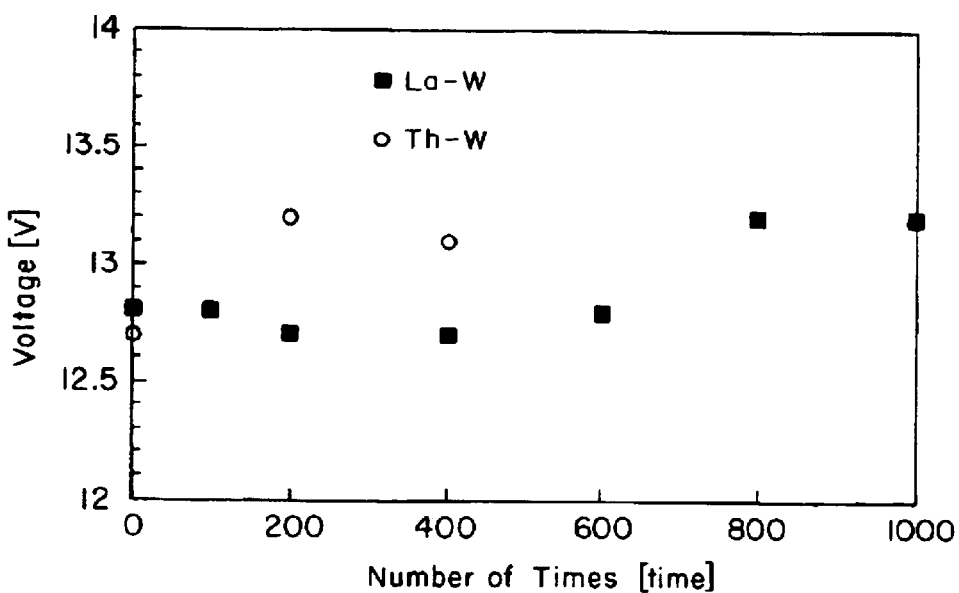
FIG. 12 is a graph showing a relation between a voltage and times of welding executed when a welding electrode with thoria and lanthana added thereto according to Embodiment 2-2 is used.

The result is shown in FIG. 10, FIG. 11, and FIG. 12.

FIG. 10 is the voltage-current characteristics when each electrode was used, and it can be known from the figures that voltage drops as a current value increases.

A life ($t$) of an electrode is defined by the expressing of $t=(E_0/(\rho J^2))\exp(Ea/kT)$, wherein J indicates a current density, and this value can be replaced with a current value if a form of a welding electrode is not changed, and when a current value is kept constant. Life of an electrode becomes longer as a voltage loaded thereto at this point of time becomes lower.

As for voltage values at a current value of around 20 A in welding in the normal mode, a voltage in zirconia is extremely high, which suggests that zirconia is not suited for use as a material as an electrode.

FIG. 11 shows a result of measurement of a voltage in welding at the first time and that at the one-hundredth time when each electrode was used.

When a melting point of an oxide is low, the oxide is evaporated from an electrode according to a temperature in welding, with a density of an oxide in the electrode lowered, which in turn results in degradation of the electron discharge performance. On the contrary, when a melting point of an oxide is high, the oxide is not evaporated and is kept in the electrode. It can be surmised that the voltage does not fluctuate even when welding is executed many times.

In cases of thoria and lantana, a voltage value in welding at the first time is the same as that in welding at the one-hundredth time, but in cases of ceria and yttria, the voltage value changes, and a voltage value in welding at the one-hundredth time is higher in both cases. The cause can be guessed that the oxides are evaporated according to an arc temperature in welding with an oxide density lowered and the electron discharge performance degraded.

FIG. 12 shows a result of measurement of a voltage in welding with an electrode with thoria or lanthana added thereto.

When thoria was added, a voltage increased in welding from the 100 time to 200 time, and when lanthana was added, a voltage increased in welding from 600 time to the 800 time. This phenomenon occurs because an added oxide is evaporated in welding and the thermoelectron discharge performance based on the conventional technology is not improved with the voltage increase. It was found in this testing, that lanthana having a higher melting point was superior to thoria.

Based on the result as described above, it can be considered that the best oxide to be added to an electrode is lanthana.

Also it was turned out that the voltage increased after welding was executed several times, and a correlation between this voltage increase and a life of an electrode was clarified, so that a life of an electrode can be checked by monitoring a voltage in arch discharge during welding, which insures welding with high reliability.

Embodiment 2-3

Measurement was made for a temperature of an electrode which gives substantial influence over the life of an electrode.

A study was made to check the effect of an oxide included in an electrode as well as of a method of holding a welding electrode over a welding electrode. In welding, the power supply unit (SPB-100-T4) and the welding machine (K8752T) each supplied from Astro Arc Co. were used. As for measurement of a temperature of a welding electrode, the temperature was detected with an optical fiber type of radiated temperature meter (Chino:IR-FBWS) and measured by using an oscilloscope (IWATU-leCroy 9362).

The thermoelectron discharge performance from a welding electrode is expressed by the Richardson-Dashman expression as $J=AT^2\exp(-\Phi(/kT)$. Herein, J indicates a current density, A indicates a thermoelectron discharge constant, T indicates a temperature of an electrode, K indicates a Boltzmann constant, and $\Phi$ indicates a work function. For this reason, to improve the thermoelectron discharge performance in arc discharge, a material with a smaller work function is used which also makes a higher temperature of a welding electrode. However, to suppress evaporation of an added oxide from a tip of an electrode due to temperature increase in welding, an electrode temperature should preferably be kept lower with an oxide having a high melting point added to the welding electrode for the purpose to realize a long-life welding electrode.

In the testing, the temperature of a welding electrode with any of thoria, lanthana, ceria, and yttria added thereto respectively was monitored. They had a hyperbola function type of form. It should be noted that the arc shield gas was flown at a rate of $H_2/Ar$.

Figure 13:
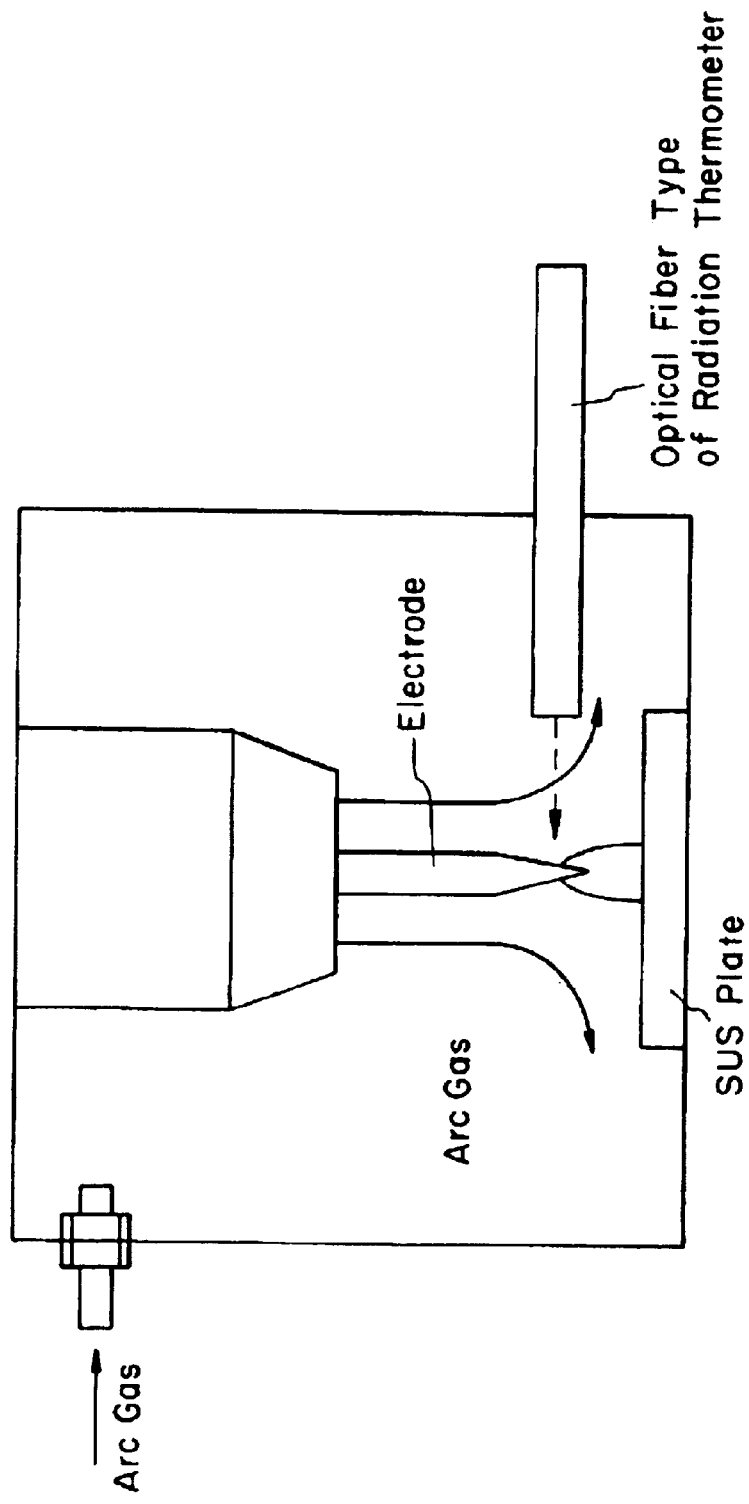
FIG. 13 is a general view showing an apparatus used for measuring a temperature of a welding electrode according to Embodiment 2-3.
Figure 14:
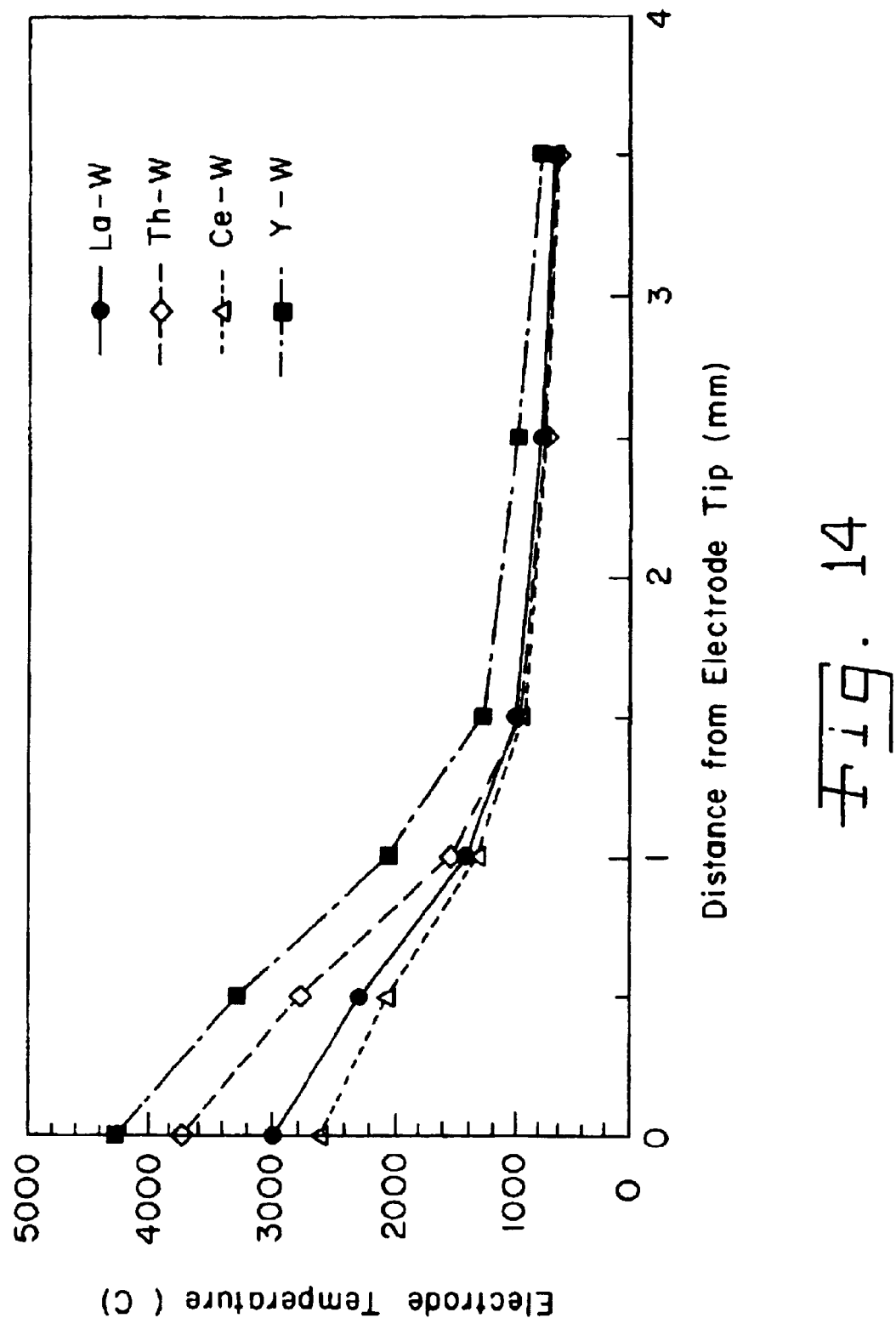
FIG. 14 is a graph showing a relation between a distance from a tip of an electrode made from each material according to Embodiment 2-3 and a temperature distribution.

A result is shown in FIG. 13 and FIG. 14.

FIG. 13 is a view showing an apparatus used for measuring the temperature of each welding electrode. In this testing, a welding holder is inserted into a shielded vessel made from stainless steel, and a temperature of the welding electrode when arc discharge is generated on a stainless steel plate is measure with an optical fiber type of radiation type thermometer. The optical fiber is fixed to the XYZ-axial stage, and a temperature at each point of a tip section of a welding electrode can be measured.

FIG. 14 shows a result of measurement of a temperature at a tip section of a tungsten electrode with any of thoria, lanthana, ceria, and yttria added thereto. A current value in welding is 30 A, and the figure shows a temperature of a welding electrode when arc discharge is executed for 2 seconds. From this figure, it can be understood that a temperature of a welding electrode is higher at a point closer to a tip of the electrode, that a temperature of an electrode varies according to a material added to a welding electrode, and that a temperature at a tip of a welding electrode becomes lower in the order of yttria, thoria, lanthana, and ceria added to each electrode. This tendency is consistent to a result of measurement of the voltage-current characteristics in welding, and it can be considered that a current value in welding becomes larger in an electrode with a material having a larger work function added thereto and a temperature of a welding electrode becomes higher in association with an increase of the current value in welding.

When thoria of yttria is added, a temperature of the welding electrode remarkably increases, and an added oxide is evaporated from the welding electrode according to a temperature in welding with a density of an oxide in the welding electrode decreased, which can be considered as a cause for degradation of the electron discharge performance.

Although a temperature of an electrode with ceria added thereto is low, as a melting point of ceria itself is low, the oxide is evaporated in welding like in an electrode with thoria or yttria added thereto, and degradation of the electron discharge performance is rather more remarkable as compared to a case where lanthana is added to a welding electrode.

In contrast, lanthana has a small work function, and a potential temperature increase when added to a welding electrode is not large. Since the boiling point of lanthana itself is high, evaporation of the oxide associated with the temperature increase in welding is smaller as compared to other oxides added to a welding electrode, which can be considered as a cause for the fact that an oxide density in the welding electrode hardly becomes lower. For this reason, an electrode with lanthana added therein can be regarded as the best long-life welding electrode.

Embodiment 3

Figure 2A:
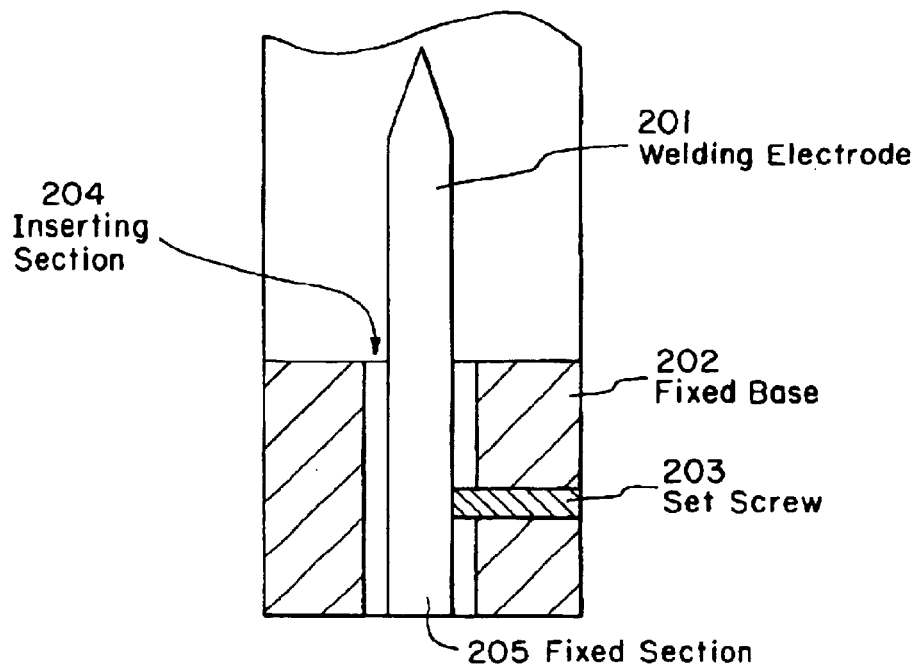
FIG. 2 is a shows an example of a structure for fixing a welding electrode to a fixing base, both based on the conventional technology, FIG. 2($a$) is a simulated view showing a side cross-section thereof, while FIG. 2($b$) is a top view thereof.
Figure 2B:
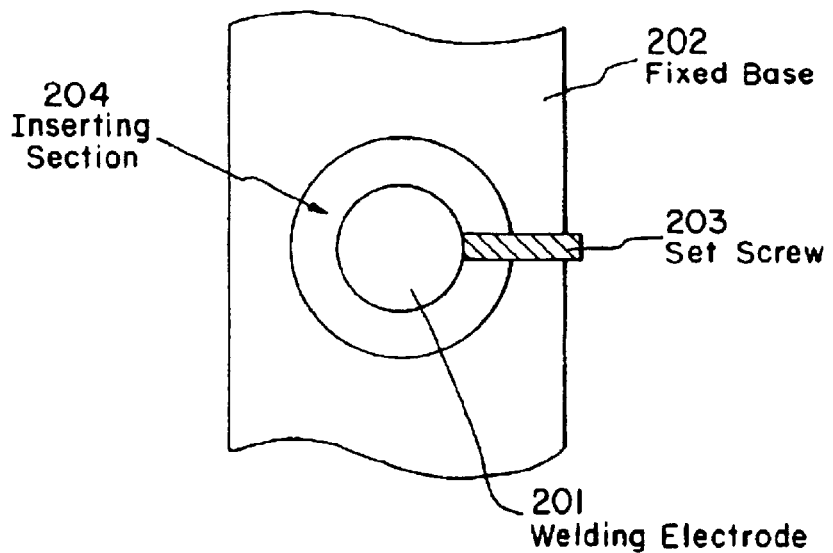
Figure 3A:
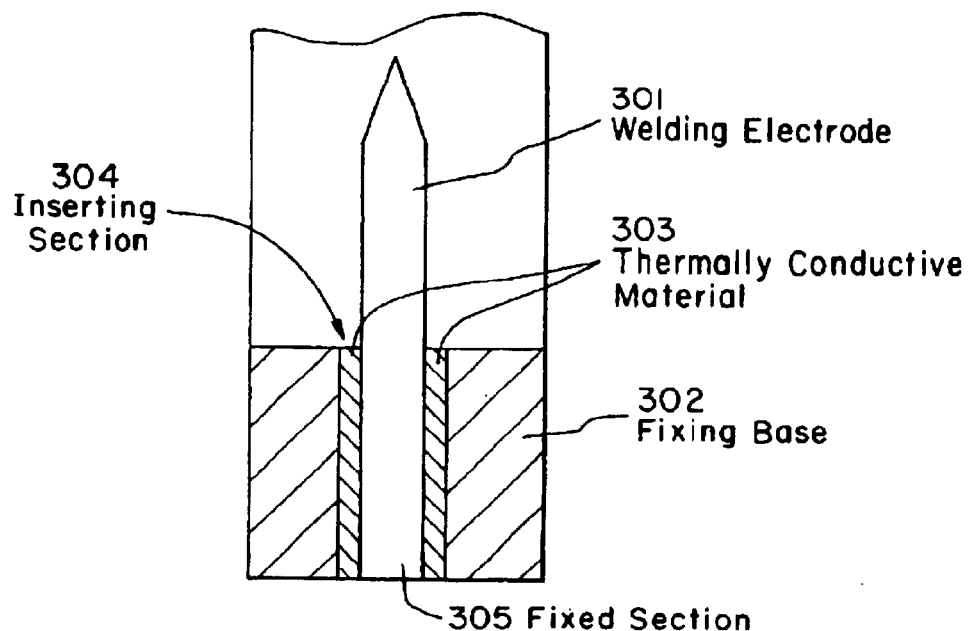
FIG. 3 is a shows an example of a structure for fixing a welding electrode to a fixing base according to the present invention, and FIG. 3($a$) is a simulated view showing a side cross-section thereof, while FIG. 3($b$) is a top view thereof.
Figure 3B:
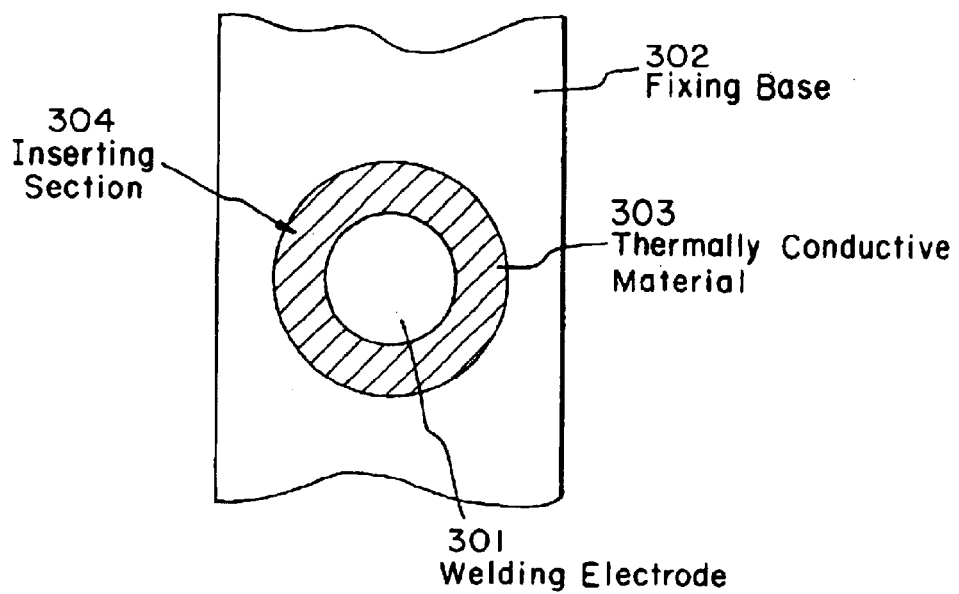

In this embodiment, to improve the heat-emitting performance of a welding electrode, heat accumulated in the welding electrode, heat accumulated in the welding electrode, as shown in FIG. 3, is emitted within a short period of time, not by fixing the welding electrode 201 to the fixing base 202 with the screw 203 as shown in FIG. 2, but by applying silver 303 having a high thermal conductivity between the welding electrode and the fixing base 302 as shown in FIG. 3 for the purpose of preventing degradation of the welding electrode due to a high temperature.

The evaluating method is the same as that in Embodiment 1 and Embodiment 2, and the result is shown in Table 4. A tungsten electrode with 2 wt % of $The_2O_3$ added therein and having a sharp tip was used, and the testing was executed under the same conditions.

TABLE 4

|  | Conventional | Fixed with silver |
|---|---|---|
| Times | 60 | 90 |

Table 4 clearly shows that durability of an electrode was improved in the fixing method utilizing silver to insure a high heat-emitting effect, as compared to the conventional fixing method.

In this embodiment, silver 303 was inserted into a section between the welding electrode 301 and fixing base 302, but the same effect as that obtained with silver can be obtained with other materials provided that the thermal conductivity is high, and also the same effect can be achieved by increasing a contact area between the welding electrode 301 and the fixing base 302.

It should be noted that burning of a surface of a welding object did not occur also in this embodiment.

The mechanical characteristics such as the tensile strength and the bending strength were not inferior to those in the conventional technology.

Embodiment 3-2

Figure 15:
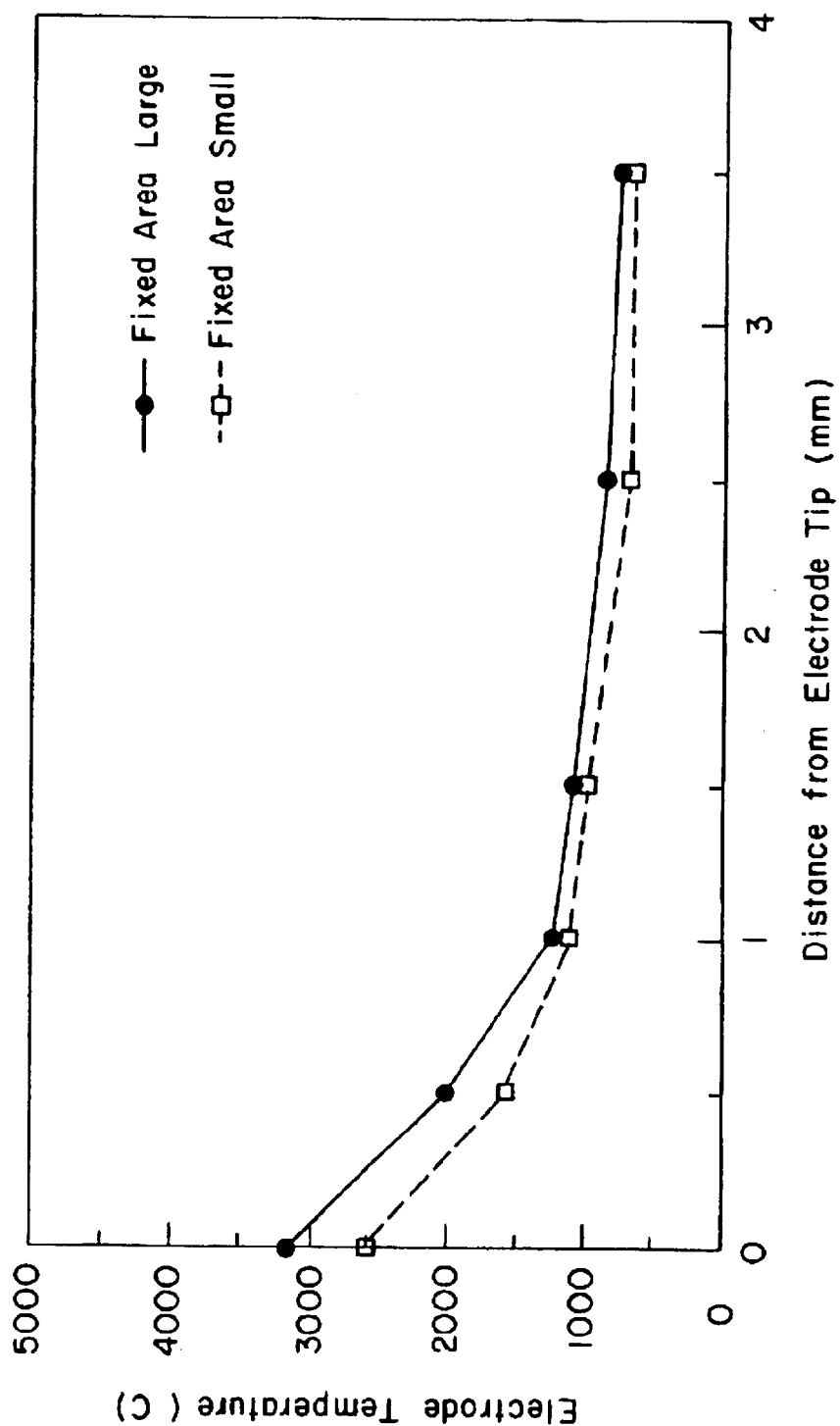
FIG. 15 is a graph showing a relation between a distance from an electrode tip and a temperature distribution in the fixing structure according to Embodiment 2-3.

FIG. 15 shows a temperature of a welding electrode when a method of holding a welding electrode was changed.

Namely, in this embodiment, as shown in FIG. 3, a fixed section 305 of the welding electrode 301 is inserted via a thermally conductive material 303 into a inserting section 304 of the fixing base 302 having the inserting section 304 for the welding electrode 301 to be inserted therein, and the welding electrode 301 is fixed to the fixing base 302 by uniformly contacting a peripheral surface of the fixed section 305 of the welding electrode 301 to the fixing base 302.

In this embodiment, powder-state silver dissolved in an organic solvent was poured into a clearance with a width of approximately 100 μm between the welding electrode 301 and the fixing base 302, and then dried.

The form of the welding electrode was similar to a form of the equipotential surface as shown in FIG. 1.

A temperature of the welding electrode was measured with the fixing structure as described above according to the same method as that in Embodiment 2-2. It should be noted that the temperature measurement was executed also by using the fixing structure as shown in FIG. 2. The result is shown in FIG. 15.

In FIG. 15, □ indicates a result in the embodiment, and ● indicates a result in an example for comparison.

As shown in FIG. 15, the temperature on the welding electrode (distance=0) in the embodiment is lower by around 500° C. as compared to that in the example, for comparison. This phenomenon presumably occurred because a contact area between the welding electrode and fixing base increased because of the fixing with silver paste having a high thermal conductivity and heat generated in arc discharge is emitted from a tip of the welding electrode.

Embodiment 3-3

Figure 8:
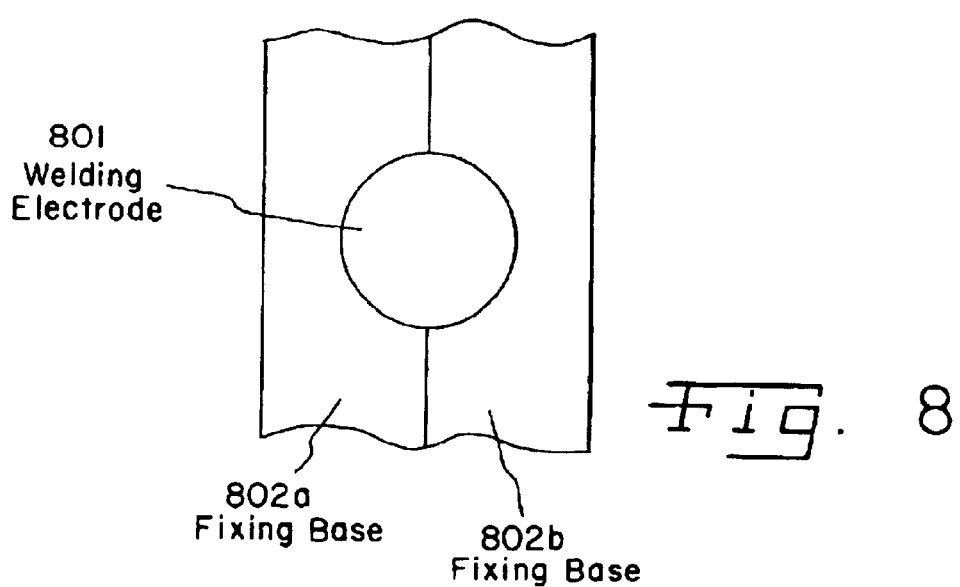
FIG. 8 is a top view showing an example of a structure for fixing a welding electrode to a fixing base according to the present invention.

In this embodiment, the fixing structure for a welding electrode as shown in FIG. 8 was used.

Namely, the fixing base is divided into portions 802a, 802b, and a fixed section of a welding electrode 801 is held between the divided portions 802a, 802b to affix the welding electrode 801 to the fixing bases 802a, 802b.

Also in this embodiment, the same experiment as that in Embodiment 2-4 was executed.

In this embodiment, the temperature in the welding electrode section (distance *0) was lower be around 400° C. as compared to that in the conventional technology. This phenomenon presumably occurred because the contact area between the welding electrode and fixing base increase and heat generated in arc discharge is emitted from a tip of the welding electrode.

Embodiment 4

In this embodiment, the current value in welding was lowered by adding helium into a welding gas (argon).

There is a correlation between a life of a welding electrode and the current value in the electrode, and a life of an electrode becomes longer as the current value becomes lower. In this embodiment, the YOKOGAWA LR4110 recorder was used for measurement of the current value.

However, a tungsten electrode with The$_2$O$_3$ added by 2 wt % therein and having a sharp tip was used in the testing.

Figure 4:
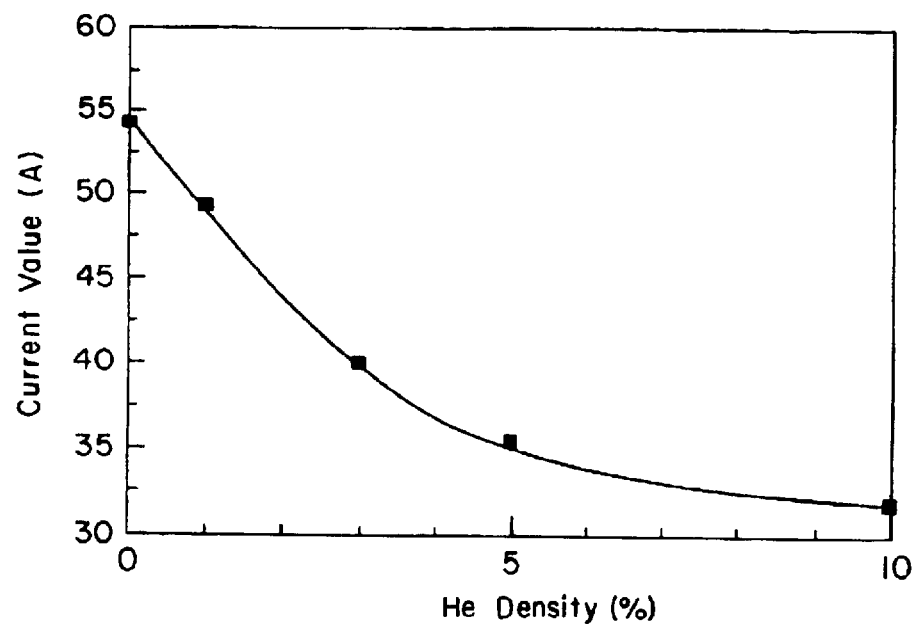
FIG. 4 is a is a graph showing a relation between a helium density and a welding current value when helium is added to a welding gas (argon) according to the present invention.
Figure 5:
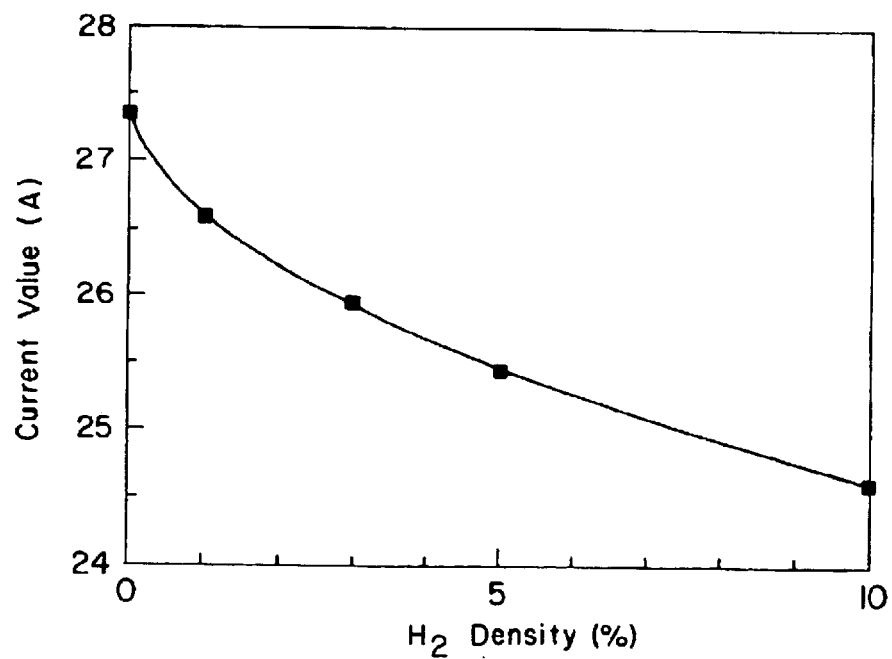
FIG. 5 is a graph showing a relation between a hydrogen density and a welding current value when hydrogen is added to a welding gas (hydrogen) according to the present invention.

The result is shown in FIG. 4. It is clearly understood from FIG. 4 that the current value in an electrode is lowered because of the thermal pinch effect when helium is added and therefore the durability of the electrode is improved.

Although helium was added in this embodiment, the durability of an electrode is further improved when a gas with a high thermal conductivity such as hydrogen is added as an added gas because the current value is further lowered. Especially when hydrogen is added, oxidization of an electrode is prevented because of the reduction by hydrogen. Therefore the durability of an electrode is further improved.

It should be noted that burning of a surface of a welded object did not occur.

Also the mechanical characteristics such as the tensile strength and the bending strength of the welded section were not inferior to those in the conventional technology.

Embodiment 6

Figure 6:
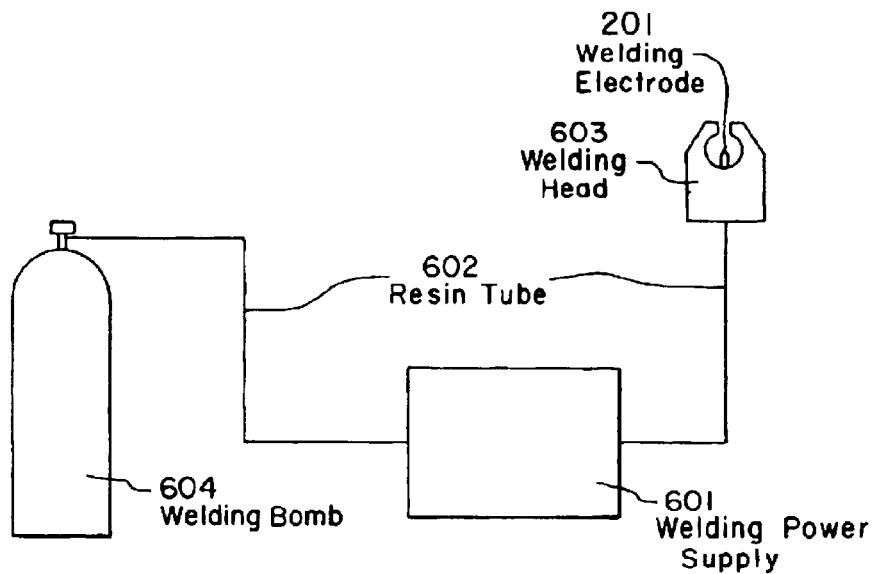
FIG. 6 is a simulated view showing an example of a conventional type of welding gas supply system.
Figure 7:
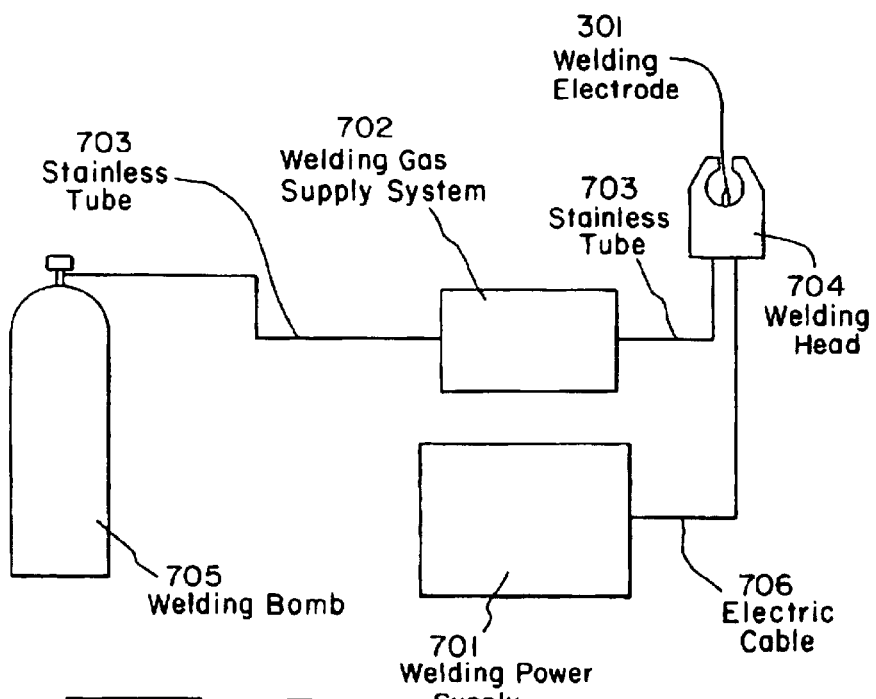
FIG. 7 is a simulated view showing an example of a welding gas supply system according to the present invention.

In the conventional technology as shown in FIG. 6, a welding gas is supplied by a welding power supply unit 601 through a resin tube 602 emitting a large quantity of discharged gas to a welding head 603. In this embodiment, to remove impurities (such as oxygen, moisture, or others) in atmosphere generated during welding, a gas supply system and a tube 703 as shown in FIG. 7, in each of which a material emitting a large quantity of discharged gas such as resin is not used, and which is made only from metal (stainless steel) to supply a welding gas to the welding head 704 for the purpose to improve the atmosphere for welding.

Densities of impurities in the conventional technology and in this embodiment are shown in Table 5.

TABLE 5

|  | Conventional | New gas supply system |
| --- | --- | --- |
| Gas supply system | 0.4 ppm | 0.4 ppm |
| Welding gas | 12.1 ppm |  |
| Welding head | 13.1 ppm | 0.4 ppm |

Table 5 clearly shows a difference between a gas supply system in which a material emitting a large quantity of gas such as resin is sued and that in which such a material is not used.

A result of welding with this gas supply system is shown in Table 6.

The evaluating method is the same as that in Embodiments 1, 2, and 3.

A tungsten electrode with The$_2$O$_3$ by 2 wt % added therein and having a sharp tip was used in the testing, and the testing was executed under the same welding conditions.

TABLE 6

|  | Conventional | New gas supply system |
| --- | --- | --- |
| Times | 60 | 80 |

Table 6 clearly shows that durability of a welding electrode when a gas supply system with a lower impurity density is used is substantially longer as compared to that when the conventional type of gas supply system is used.

In this embodiment, electrolytically polished SUS 316L material is used in the gas supply system, but the same effect can be obtained also when passivated chromium oxide (which has excellent low gas emitting characteristics) is used.

It should be noted that burning of a surface of a welded object did not occur.

Also the mechanical characteristics such as the tensile strength and the bending strength of the welded section were not inferior to those in the conventional technology.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A welding method comprising the steps of:

supplying a mixed gas of argon and helium in which a content of helium of the mixed gas of the supplying step is in the range of 1 to less than 20%; and welding in such supplied mixed gas environment;

wherein said supplying step is utilized through a supply tube to which preciously has been conducted a chromium oxide passivation treatment.

2. A welding method comprising the steps of:

supplying one of (1) a mixed gas of helium and hydrogen, or (2) a mixed gas of argon, helium, and hydrogen; and welding in such supplied mixed gas environment;

wherein said said supplying step is utilized through a supply tube to which previously has been conducted a chromium oxide passivation treatment.

3. The welding method according to claim 2, in which a content of helium of the mixed gas of the supplying step is in the range of 1 to 90%.

4. The welding method according to claim 2, in which a content of helium of the mixed gas of the supplying step is in the range of 1 to less than 20%.

* * * * *